(12) United States Patent
Baldwin et al.

(10) Patent No.: US 9,160,933 B2
(45) Date of Patent: Oct. 13, 2015

(54) LUMINANCE BASED IMAGE CAPTURING METHODS AND APPARATUS

(71) Applicant: INTEL CORPORATION, Santa Clara, CA (US)

(72) Inventors: James A. Baldwin, Palo Alto, CA (US); Suri B. Medapati, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 112 days.

(21) Appl. No.: 13/791,499

(22) Filed: Mar. 8, 2013

(65) Prior Publication Data
US 2014/0253745 A1    Sep. 11, 2014

(51) Int. Cl.
H04N 5/225    (2006.01)
H04N 5/235    (2006.01)

(52) U.S. Cl.
CPC ........... *H04N 5/2354* (2013.01); *H04N 5/2256* (2013.01)

(58) Field of Classification Search
CPC .................... H04N 5/2256; H04N 5/2354
USPC .......................................... 348/207.1, 207.11
See application file for complete search history.

(56) References Cited

U.S. PATENT DOCUMENTS

| | | | | |
|---|---|---|---|---|
| 8,627,400 B2* | 1/2014 | Takabayashi | ................. | 725/139 |
| 2002/0141617 A1* | 10/2002 | Yamashiro et al. | ........... | 382/103 |
| 2006/0197872 A1* | 9/2006 | Chen et al. | ..................... | 348/572 |
| 2009/0185033 A1* | 7/2009 | Nozaki | ......................... | 348/77 |
| 2010/0325647 A1* | 12/2010 | Buonasera et al. | ............. | 725/12 |
| 2011/0317005 A1* | 12/2011 | Atkinson | ...................... | 348/135 |
| 2012/0324493 A1* | 12/2012 | Holmdahl et al. | .............. | 725/12 |
| 2014/0089954 A1* | 3/2014 | Sampathkumaran et al. | .. | 725/10 |
| 2014/0189720 A1* | 7/2014 | Terrazas | ......................... | 725/12 |

* cited by examiner

*Primary Examiner* — Aung S Moe
*Assistant Examiner* — Amy Hsu
(74) *Attorney, Agent, or Firm* — Schwabe, Williamson & Wyatt, P.C.

(57) ABSTRACT

In embodiments, apparatuses, methods and storage media are described that are associated with content distribution. In embodiments, one or more frames may be displayed on a display, and the frame or frames with the highest luminance level of those frames may be identified. A camera may be configured to capture an image at a point in time based at least in part on display of the frame with the highest luminance level. In some embodiments, the luminance level of the frames may be identified based at least in part on analysis of the frames by a device prior to display of the frames. In other embodiments, the luminance level of the frames may be identified based at least in part on the receipt of luminance data from a server.

24 Claims, 7 Drawing Sheets

LUMINANCE BASED IMAGE CAPTURING METHODS AND APPARATUS

TECHNICAL FIELD

The present disclosure relates to the field of data processing, and specifically to evaluating luminance levels of frames of media content.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Advances in computing, networking and related technologies have led to proliferation in the availability of multimedia content, and the manners in which the content is consumed. Today, multimedia content may be made available from fixed medium (e.g., Digital Versatile Disk (DVD)), broadcast, cable operators, satellite channels, Internet, and so forth. Users may consume content with a television set, a laptop or desktop computer, a tablet, a smartphone, or other devices of the like. In general, content may be customized according to the preferences of one or more viewers of the content. Therefore, it may be desirable to be able to determine who is viewing the content at a given time.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
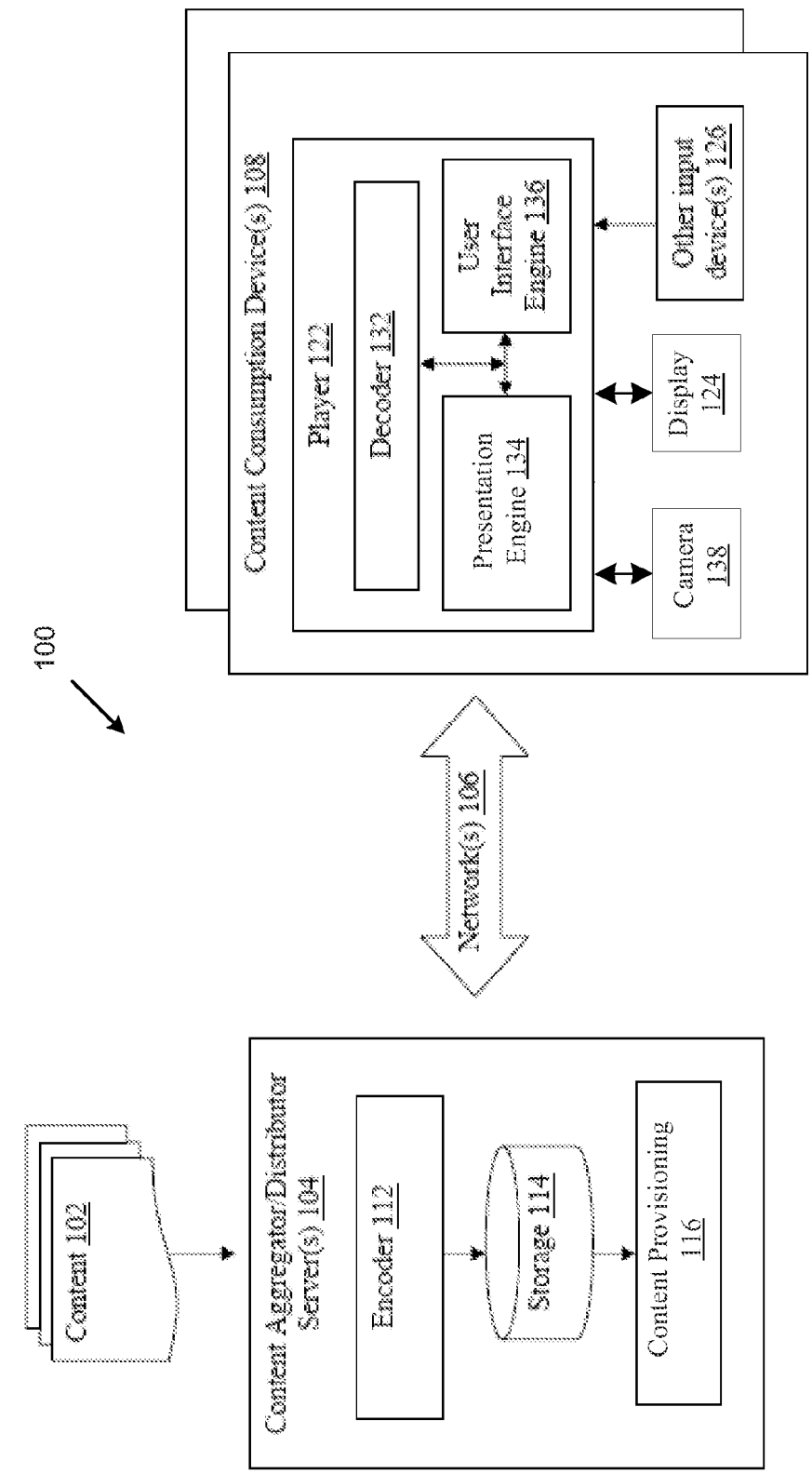
FIG. 1 illustrates an arrangement for content distribution and consumption, in accordance with various embodiments.

Apparatuses, methods and storage media associated with content distribution and/or consumption are disclosed herein. In embodiments, a client consumption device may be equipped with a display and a camera. The client consumption device may receive one or more frames of media content and determine a frame in the one or more frames that may have the highest luminance level. In one embodiment, the client consumption device may analyze the one or more frames and identify the frame(s) with the highest luminance level(s). In another embodiment, the client consumption device may receive an indication of the luminance level of at least one frame in the one or more frames from a content aggregator/distributor server. The client consumption device may be configured to capture an image with the camera concurrently with, or shortly after, the display of the frame with the highest luminance level in the one or more frames. By capturing the image close to the time of display of the frame(s) with high luminance level(s), the client consumption device may be configured to capture a higher-quality image than if the image were captured at a different time. The increased quality of the captured image may be particularly improved in the circumstance when the display of the media content by the client consumption device provides all or most of the illumination used during image capture.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Referring now to FIG. 1, an arrangement for content distribution and consumption, in accordance with various embodiments, is illustrated. As shown, in embodiments, arrangement 100 for distribution and consumption of content may include a number of content consumption device(s) 108 coupled with one or more content aggregator/distributor servers 104 via one or more networks 106. Content aggregator/distributor servers 104 may be configured to aggregate and distribute content 102 to content consumption device(s) 108 for consumption, via one or more networks 106.

In embodiments, as shown, content aggregator/distributor servers 104 may include encoder 112, storage 114 and content provisioning 116, which may be coupled to each other as shown. Encoder 112 may be configured to encode content 102 from various content providers, and storage 114 may be configured to store encoded content. Content provisioning 116 may be configured to selectively retrieve and provide encoded content to the various content consumption device(s) 108 in response to requests from the various content consumption device(s) 108. Content 102 may be multimedia content of various types, having one or more of video, audio, and/or closed captions, from a variety of content creators and/or providers. Examples of content may include, but are not limited to, movies, TV programming, user created content (such as YouTube video, iReporter video), music albums/titles/pieces, and so forth. Examples of content creators and/or providers may include, but are not limited to, movie studios/distributors, television programmers, television broadcasters, satellite programming broadcasters, cable operators, online users, and so forth.

In embodiments, for efficiency of operation, encoder 112 may be configured to encode the various content 102, typically in different encoding formats, into a subset of one or more common encoding formats. However, encoder 112 may be configured to nonetheless maintain indices or cross-references to the corresponding content in their original encoding formats. Similarly, for flexibility of operation, encoder 112 may encode or otherwise process each or selected ones of content 102 into multiple versions of different quality of service (QoS) levels. The different versions or levels may provide different resolutions, different bitrates, and/or different frame rates for transmission and/or playing, collectively generally referred to as QoS parameters. In various embodiments, the encoder 112 may publish, or otherwise make available, information on the available different resolutions, different bitrates, and/or different frame rates. For example, the encoder 112 may publish bitrates at which it may provide video or audio content to the content consumption device(s) 108. Encoding of audio data may be performed in accordance with, e.g., but are not limited to, the MP3 standard, promulgated by the Moving Picture Experts Group (MPEG). Encoding of video data may be performed in accordance with, e.g., but are not limited to, the H264 standard, promulgated by the International Telecommunication Unit (ITU) Video Coding Experts Group (VCEG). Encoder 112 may include one or more computing devices configured to perform content portioning, encoding, and/or transcoding, such as described herein.

Storage 114 may be temporal and/or persistent storage of any type, including, but not limited to, volatile and non-volatile memory, optical, magnetic and/or solid state mass storage, and so forth. Volatile memory may include, but are not limited to, static and/or dynamic random access memory. Non-volatile memory may include, but are not limited to, electrically erasable programmable read-only memory, phase change memory, resistive memory, and so forth.

Content provisioning 116 may, in various embodiments, be configured to provide encoded content as discrete files and/or as continuous streams of encoded content. Content provisioning 116 may be configured to transmit the encoded audio/video data (and closed captions, if provided) in accordance with any one of a number of streaming and/or transmission protocols. Streaming protocols may include the MPEG Dynamic Adaptive Streaming over Hypertext Transfer Protocol (MPEG-DASH) protocol defined ins ISO/IEC 23009-1 (Apr. 1, 2012), and/or some other streaming protocol. Transmission protocols may include, but are not limited to, the transmission control protocol (TCP), user datagram protocol (UDP), and so forth. Networks 106 may be any combinations of private and/or public, wired and/or wireless, local and/or wide area networks. Private networks may include, e.g., but are not limited to, enterprise networks. Public networks, may include, e.g., but is not limited to the Internet. Wired networks, may include, e.g., but are not limited to, Ethernet networks. Wireless networks, may include, e.g., but are not limited to, Wi-Fi, or 3G/4G networks. It would be appreciated that at the content distribution end, networks 106 may include one or more local area networks with gateways and firewalls, through which content aggregator/distributor servers 104 go through to communicate with content consumption device(s) 108. Similarly, at the content consumption end, networks 106 may include base stations and/or access points, through which content consumption device(s) 108 communicate with content aggregator/distributor servers 104. In between the two ends may be any number of network routers, switches and other networking equipment of the like. However, for ease of understanding, these gateways, firewalls, routers, switches, base stations, access points and the like are not shown.

In embodiments, as shown, a content consumption device 108 may include player 122, display 124 and user input device 126. Player 122 may be configured to receive streamed content, decode and recover the content from the content stream, and present the recovered content on display 124, in response to user selections/inputs from user input device 126. The content consumption device 108 may further include or otherwise be coupled with a camera 138 configured to capture images. In embodiments, the camera 138 may be configured to perform analog or digital capture of images including still images or moving images.

In embodiments, player 122 may include decoder 132, presentation engine 134 and user interface engine 136. Decoder 132 may be configured to receive streamed content, decode, and recover the content from the content stream. Presentation engine 134 may be configured to present the recovered content on display 124, in response to user selections/inputs. In various embodiments, decoder 132 and/or presentation engine 134 may be configured to present audio and/or video content to a user that has been encoded using varying encoding control variable settings in a substantially seamless manner. Thus, in various embodiments, the decoder 132 and/or presentation engine 134 may be configured to present two portions of content that vary in resolution, frame rate, and/or compression settings without interrupting presentation of the content. User interface engine 136 may be configured to receive the user selections/inputs from a user.

While shown as part of a content consumption device 108, display 124, user input device(s) 126, and/or camera 138 may be standalone devices or integrated, for different embodiments of content consumption device(s) 108. For example, for a television arrangement, display 124 may be a standalone television set, Liquid Crystal Display (LCD), Plasma and the like, while player 122 may be part of a separate set-top set, and other user input device 126 may be a separate remote control or keyboard. The camera 138 may be integrated with one or more of the display 124, the player 122, or even the user input device 126. Similarly, for a desktop computer arrangement, player 122, display 124, other user input device(s) 126, and the camera 138 may all be separate standalone units. On the other hand, for a laptop, ultrabook, tablet, or smartphone arrangement, display 124 may be a touch sensitive display screen that includes other user input device(s) 126, and player 122 may be a computing platform with a soft keyboard that also include one of the user input device(s) 126. Further, display 124, player 122, and camera 138 may be integrated within a single form factor. Similarly, for a smartphone arrangement, player 122, display 124, other user input device(s) 126, and camera 138 may be likewise integrated.

Figure 2:
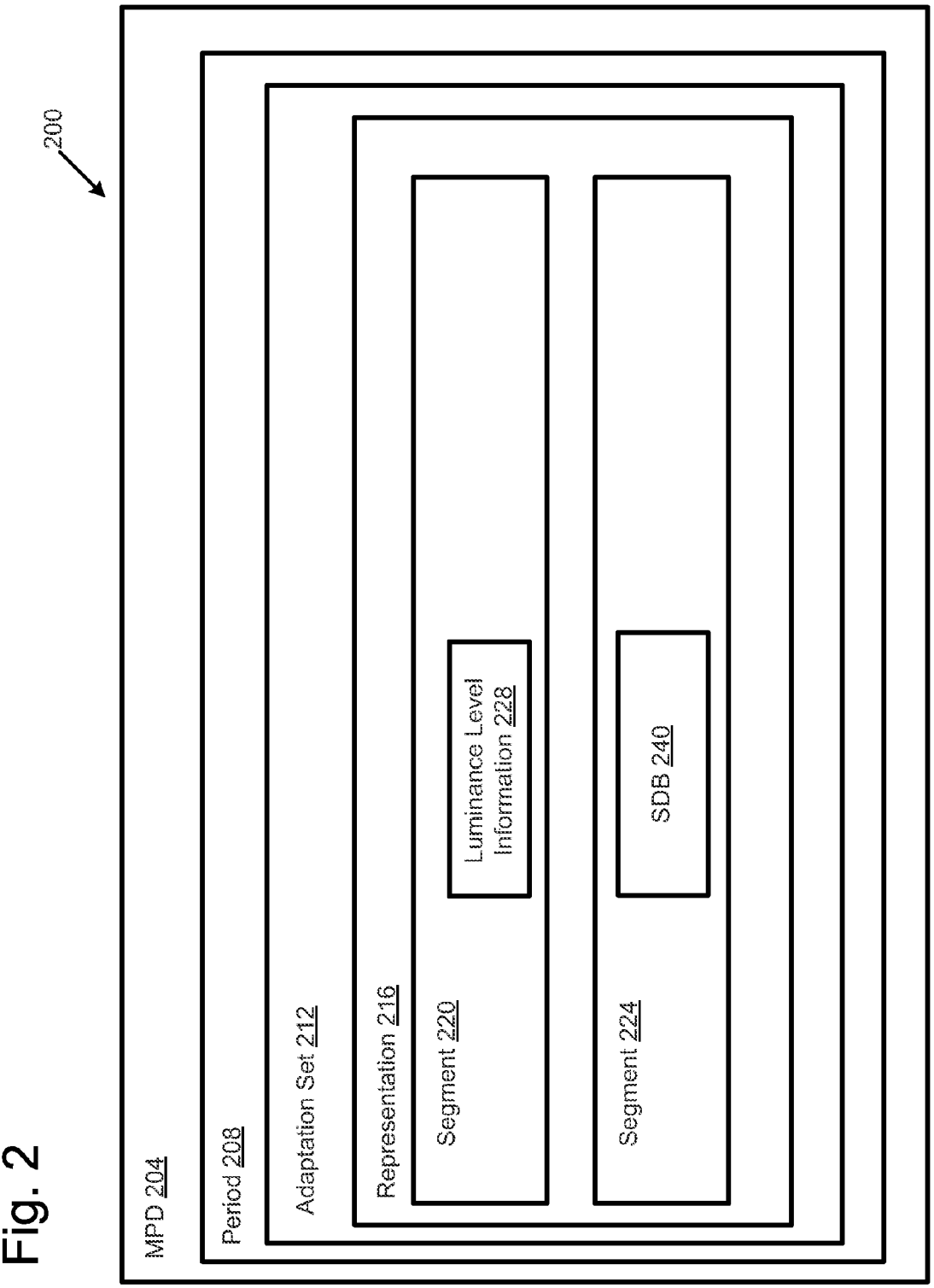
FIG. 2 illustrates an arrangement of content in multiple nested structures, in accordance with various embodiments.

FIG. 2 depicts exemplary encoded media 200. In embodiments, content 102 may be encoded by encoder 112 into different versions having different bit rates, channels, sizes, or some other parameter which may generally collectively referred to as a QoS parameter defining a QoS level, as described above. Each version of the encoded media 200 may then be divided into discrete segments which can then be requested by the content consumption device 108, as described in further detail below. Specifically, the content consumption device 108 may send a request via hypertext transfer protocol (HTTP) or some other internet protocol to a server such as a content aggregator/distributor server 104. The content aggregator/distributor server 104 may respond by providing the requested segment.

A potential benefit of the content 102 being encoded into different versions according to multiple different QoS parameters and QoS levels may be realized when content consumption device 108 detects that a lower QoS level is necessary, or a higher QoS level is permissible, then the content consumption device 108 may simply request a segment at a different QoS level. Similarly, the content consumption device 108 may request different segments if a viewer of the content 102 requests additional features such as different audio streams, closed captioning, or the like. The content aggregator/distributor server 104 may respond by supplying the segment at the different QoS level, rather than having to supply and re-buffer the entire content 102. This allows the viewing of the content 102 to take place in a more dynamic fashion without lengthy buffering or re-buffering periods.

Returning to FIG. 2, the encoded media 200 may include a media presentation description (MPD) 204 document. The MPD 204 may describe a sequence of periods 208 that represent a media content period during which a consistent set of encoded versions of the media content is available. In other words, the set of available bitrates, languages, captions, subtitles, or other QoS parameters or QoS levels may remain unchanged during the period 208. Although only a single period 208 is depicted in FIG. 2, other embodiments may have an MPD 204 with multiple periods, each having different available bitrates, languages, captions, subtitles, or other QoS parameters or QoS levels.

Within a period 208, the media content may be arranged into adaptation sets 212. The adaptation set 212 may represent a set of interchangeable encoded versions of one or several media content components such as a video component, an audio component, etc. Other components such as captions or audio descriptions may likewise have a separate adaptation set 212. Although only a single adaptation set 212 is shown in FIG. 2, in other embodiments each period 208 may comprise a plurality of adaptation sets 212.

Each adaptation set 212 may comprise one or more representations 216. A representation may describe the deliverable encoded versions of one or several media content components of the content 102. For example, a representation 216 may include one or more media streams for each media content component such as audio components, video components, captions, or audio descriptions. In general, any single representation 216 within an adaptation set 212 may be sufficient to render the contained media content components. In embodiments, each adaptation set 212 may include a plurality of representations 216.

Each representation 216 may be divided into one or more segments 220 and 224. In general, a segment 220 or 224 may be considered to be the largest unit of the encoded media 200 that may be retrieved by a single request. In embodiments, the segment 220 may have a different length or duration than segment 224. In some embodiments, the segment length may vary between representations such that the length of one or both of segments 220 and 224 in representation 216 may be on the order of a few seconds, while in another representation the length of a segment may be as long as the length of the representation or some value in between.

In embodiments, each segment such as segment 220 or segment 224 may be encoded according to an ISO base media file format such as that defined in ISO/IEC 14496-12:2012. Specifically, each segment such as segment 220 or segment 224 may comprise a plurality of segment data boxes (SDBs) such as SDB 240. In some embodiments one or more of the segments, for example segment 220, may comprise luminance level information 228, as described in greater detail below.

In some embodiments, it may be desirable to know who is viewing the media content. For example, the content may be delivered on a subscription basis where different prices are charged by the content provider based on the number of people viewing the content. As another example, it may be known that a specific viewer enjoys a specific type of content or product, and so targeted advertising may be delivered to the viewer, for example by displaying advertising related to sports packages to a user known to have a preference for sports programming. As yet another example, the content provider may offer a setting which enables an automatic change or cancellation in the media content being delivered based on the viewer, for example to enforce age-restrictions or parental-locks of certain content. Other additional or alternative advantages of identifying the viewership of the media content may exist.

Viewers may be identified, in various embodiments, through capture of one or more images that contain the viewers, followed by subsequent identification of the viewers from the captures image. In some cases, however, the viewers of the media content may be viewing the media content in a relatively dark room. For example, many people may enjoy watching a movie or television with the lights off to reduce glare on the display such as display 124. In these cases, it may be difficult to capture a high-quality image to identify the number of people viewing the media content, or to identify a specific individual viewing the media content. However, in some embodiments the display 124 may be able to generate enough light to be able to identify the person or people viewing the media content. For example, if the scene being shown on the display 124 is of a sunny day or other bright object, then the display 124 may output enough light such that the camera 138 can capture an image of the audience viewing the media content. Therefore, it may be valuable to be able to determine when a bright object will be displayed in a frame of the media content.

Figure 3:
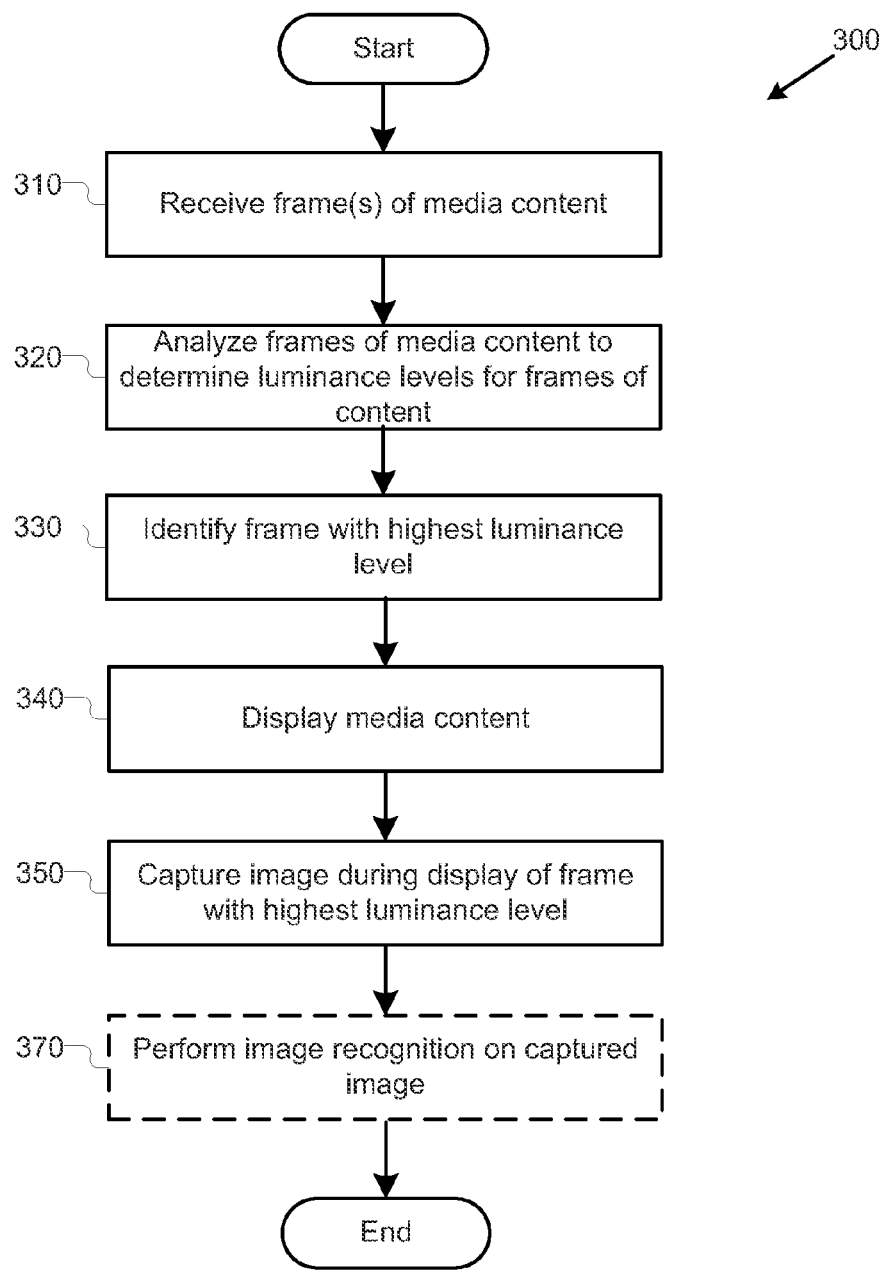
FIG. 3 illustrates an example process of identifying luminance levels of one or more frames of content, in accordance with various embodiments.

FIG. 3 illustrates a first process 300 for determining, by a content consumption device 108 when a relatively bright frame in the media content will be displayed. In embodiments, the time of the relatively bright frame may be identified through measurement of the luminance level of the frame. First, the content consumption device 108 may receive one or more frames of the media content at 310. For example, the content consumption device 108 may receive a segment such as segment 220 or 224, the segments comprising one or more frames of the media content.

The content consumption device 108 may then analyze the one or more frames of the media content to determine the luminance levels for the one or more frames of media content at 320. As noted above, the luminance level of the frame may be a measure of how "bright" the frame is or how much light is output during display of the frame. In some embodiments, the content consumption device 108 may analyze each frame in the one or more frames, while in other embodiments the content consumption device 108 may only analyze some of the frames in the one or more frames. If the time between receiving the media content at the content consumption device 108 and displaying the media content on the display 124 is relatively short, and the amount of received frames of the media content is relatively large, then the content consumption device 108 may only be able to analyze every other frame, every third frame, etc. of the media content. However, in embodiments where the content consumption device 108 has enough time to analyze every frame of the received media content, then it may be desirable for the content consumption device 108 to do so. In some embodiments, the content consumption device 108 may be configured to determine luminance levels by determining average luminance levels of the frames. In other embodiments the content consumption device 108 may determine luminance levels through one or more determinations of peak luminance levels, mean luminance levels, median luminance levels, and/or other measurements of luminance level.

Based on the analysis at 320, the content consumption device 108 may identify a frame with a highest luminance level in the received frames at 330. For example, if 60 frames of media content are received, then the content consumption device 108 may identify the frame with the highest luminance level in the received 60 frames. Alternatively, if only a subset of the 60 frames are analyzed at 320, then the content consumption device 108 may identify the frame with the highest luminance level in the analyzed frames. In some embodiments, the luminance level of the frame with the highest luminance level may be compared against a threshold luminance level and if the highest luminance level is not above the threshold, then the content consumption device 108 may analyze additional frames or note that the highest luminance level is lower than the threshold.

After the frame with the highest luminance level is identified at 330, then the frames of the media content may be displayed at 340, for example on display 124. In some embodiments, one or more of the analyzed frames may be displayed before analysis is complete for all frames of the one or more frames being analyzed. A camera such as camera 138 may capture an image at 350 during a point in time that is selected based at least in part on a result of the identification of the frame at 330. For example, the camera 138 may capture the image at 350 at a time near display of the frame with the highest luminance level on display 124. For example, the image capture may occur concurrently with, or shortly after, display of the frame with the highest luminance level on display 124. In embodiments, the camera 138 may capture an image of the viewers of the displayed media content. For example, in some embodiments, display by display 124 of the frame with the highest luminance level may sufficiently illuminate the audience viewing the media content such that camera 138 may capture the image of the audience at a point in time based on the identified frame such as substantially concurrently with, or shortly after, the display of the frame with the highest luminance level.

In other embodiments, the camera 138 may capture an image during display of a frame that does not have the absolute highest luminance of the analyzed frames. For example, the determination at 320 may show that one or more consecutive frames have high luminance values, thus providing a period of time during which a frames of relative high luminance value are displayed, even if none has the absolute highest value analyzed. Thus, the content consumption device 108 may cause the camera 138 to capture an image during display of these consecutive frames, rather than during display of the frame with the highest luminance value. As noted above, in some embodiments display of the frame or frames with relatively high luminance values may project sufficient light to illuminate the room such that the image capture may occur shortly after the display of the frames. In other embodiments, multiple images may be captured such that image capture may begin prior to display of the identified frame or frames. The process 300 may then end.

In some embodiments, before the process 300 ends, the content consumption device 108 may optionally perform some form of image recognition on the captured image at 370. For example, the content consumption device 108 may perform image recognition to identify the number of people viewing the media content. The content consumption device 108 may additionally or alternatively perform specific image recognition such as facial recognition to identify one or more specific individuals viewing the content. In some embodiments, the content consumption device 108 may then transmit data regarding one or more viewers of the media content to the content aggregator/distributor server 104. Alternatively or additionally the content consumption device 108 may transmit the image (or some transformation thereof) to the content aggregator/distributor server 104 so that the content aggregator/distributor server 104 may perform an image and/or facial recognition process on the content as described above. In response to the image and/or facial recognition processes by the content consumption device 108 and/or the content aggregator/distributor server 104, the media content displayed to the viewers of the content may be changed or cancelled as described above.

Although the above process 300 may be performed with respect to one or more frames received in a single segment of media content such as segment 224, in some embodiments the analysis of frames of media content at 320 may be performed against frames in a plurality of segments. For example, in some embodiments it may be desirable to only capture an image every 30 seconds, every minute, or according to some other time period. However, if process 300 is performed with respect to frames in a segment which is only four seconds long, then it may not be desirable to separately identify the frame with the highest luminance level in each segment. Rather, it may be desirable to analyze a plurality of segments together at 320 and identify the frame with the highest luminance level at 330 in the thirty second or minute long period.

Additionally, as noted above, it may be desirable for the process 300 to be performed every thirty seconds, every minute, or according to some other time period. If the media content is longer than that time period, then it may be desirable to perform the process 300 multiple times during display of the media content.

Finally, in some embodiments it may be desirable to identify more than one frame at 330, for example it may be desirable to identify one or more frames that have a sufficiently high luminance level to capture a sufficient image at 350. In one embodiment, a sufficiently high luminance level may be defined with respect to a given threshold as will be recognized in the art. This embodiment may be advantageous if, for example, the received frames comprise two minutes of media content and it is desired to capture an image multiple times during the display of the two minutes of media content.

Figure 4:
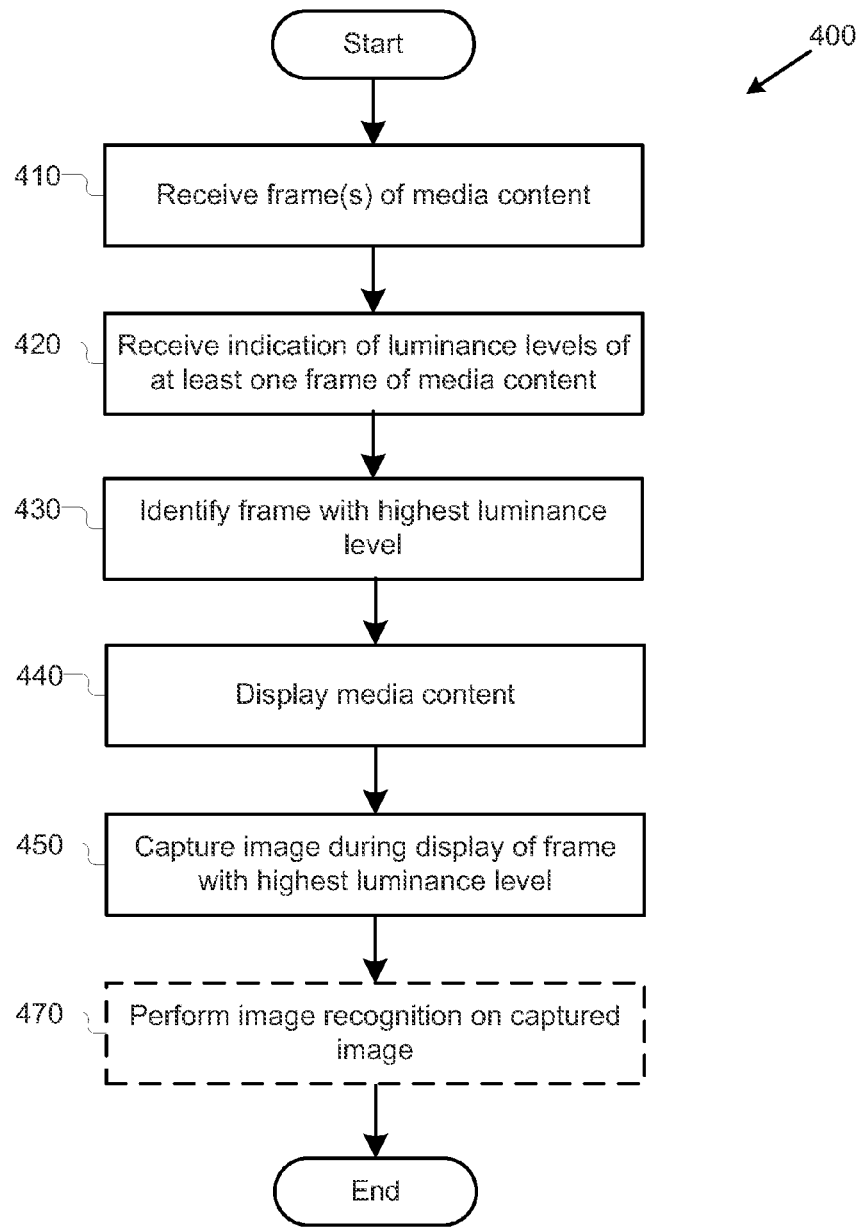
FIG. 4 illustrates another example process for identifying luminance levels of one or more frames of content, in accordance with various embodiments.

In some embodiments the decoder 132 of the content consumption device 108 may only receive the media content a very short time before the content is to be displayed by the display 124. Therefore, it may be difficult to perform the process 300 in the time between receipt and display of the media content. FIG. 4 depicts an alternative embodiment of a process 400 for determining by a content consumption device 108 when a relatively bright frame in the media content will be displayed. In this embodiment the content consumption device 108 may receive one or more frames of the media content at 410. The content consumption device 108 may further receive an indication of the luminance levels of the one or more frames of the media content at 420, for example average luminance levels or some other measurement of the luminance level described above. In embodiments, the encoder 112 or some other element of the content aggregator/distributor server 104 may analyze the one or more frames of the media content and determine the luminance levels of the frames. Then, when transmitting the encoded content to the content consumption device 108, the indication may be included with the transmission as explained in greater detail below with respect to FIG. 5.

The indication may be used to identify the frame with the highest luminance level in the one or more frames at 430. Then the media content may be displayed at 440 and the camera 138 may capture the image at 450 as described above. For example, in some embodiments the indication may include both a presentation time and a luminance level for each frame in the one or more frames. Then, the content consumption device 108 may be able to analyze the indication to determine which frame has the highest luminance level, and when that frame will be presented. In other embodiments, the content aggregator/distributor server 104 may simply identify the frame with the highest luminance level in the one or more frames. The content consumption device 108 may then instruct the camera 138 to capture the image of the audience at a point in time based on when the frame with the highest luminance level will be displayed, as described above. Then the process may end.

In some embodiments, the process 400 may additionally include performing one or both of image or facial recognition at 470. Performing the image or facial recognition at 470 by the content consumption device 108 may include transmitting data regarding the image to a content aggregator/distributor server 104. Additionally or alternatively, the content consumption device 108 may transmit the image itself to the content aggregator/distributor server 104 which may perform the image and/or facial recognition. In response to receiving the image and/or the image data, the content aggregator/distributor server 104 may alter or cancel the media content as described above.

Figure 5:
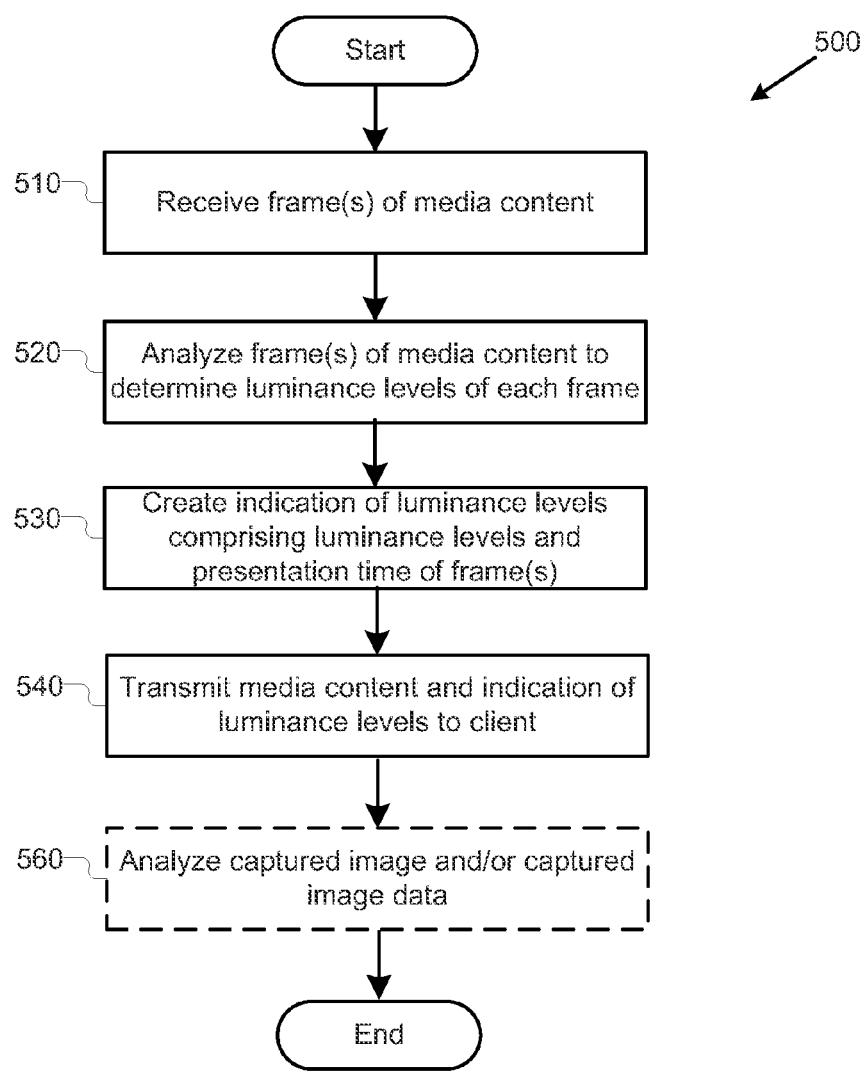
FIG. 5 illustrates an example process for encoding luminance levels of one or more frames of content, in accordance with various embodiments.

FIG. 5 illustrates an exemplary process 500 which may be performed by the content aggregator/distributor server 104 to create the luminance level indication described with respect to FIG. 4. In some embodiments this process 500 may be performed by the encoder 112, while in other embodiments the process 500 may be performed by a different element of the content aggregator/distributor server 104. Although the process 500 will be described herein with respect to the content aggregator/distributor server 104, in some embodiments, the process may be performed by an alternative content analysis device (not shown) which is communicatively coupled with the content aggregator/distributor server 104 and configured to analyze the luminance levels of frames in the media content.

Initially the content aggregator/distributor server 104 may receive one or more frames of the media content at 510. The content aggregator/distributor server 104 may then analyze the one or more frames of media content to determine luminance levels of each frame at 520. In other embodiments only a subset of the one or more frames may be analyzed, as described above with respect to FIG. 3.

The content aggregator/distributor server 104 may then create the indication at 530. In embodiments, the indication may include one or both of the presentation time of each frame in the one or more frames (or subset of frames) and the luminance levels of the frames. Finally, the content aggregator/distributor server 104 may transmit the media content and the indication of luminance levels to the client content consumption device 108 at 540 and end. In some embodiments the indication may be transmitted alongside the media content for example as part of header information or some other portion of the media content. In some embodiments the indication may be transmitted as luminance level information 228 of a segment 220, a representation 216, within a SDB 240 of the segment 224, or in some other portion of the media content. In other embodiments, the indication may be transmitted to the content consumption device 108 separately from the media content.

In some embodiments process 500 may additionally include performing image and/or facial recognition or analyzing captured image data at 560 if the content consumption device 108 transmits the image and/or data to the content aggregator/distributor server 104 as described above with respect to process 400.

Processes 400 and 500 may present advantages over process 300 in some embodiments. For example, by separately encoding and transmitting the indication to the content consumption device 108, the processing time of the content consumption device 108 may be lessened. Additionally, providing the indication may allow the content consumption device 108 to treat the process of capturing the image as a less computationally intensive process because the frame with the highest luminance level may be identified in advance when spare computing resources are available. For example, in some embodiments the indication may be received at 420 for a frame or frames that are going to be displayed at 440 almost immediately upon receipt of the frames by the content consumption device 108. However, in other embodiments the indication and the frame or frames may be received at a time in advance of the display of the frame or frames. For example, if the frame or frames are organized into segments such as segment 220, then a segment may be received while one or more preceding segments are being displayed or are queued for display. If the indication is received for a frame or frames that are several seconds or even minutes in the future, then there is a greater time period during which the frame with the highest luminance level may be identified at 430, and so computer resources may be more easily optimized during this time period.

Figure 6:
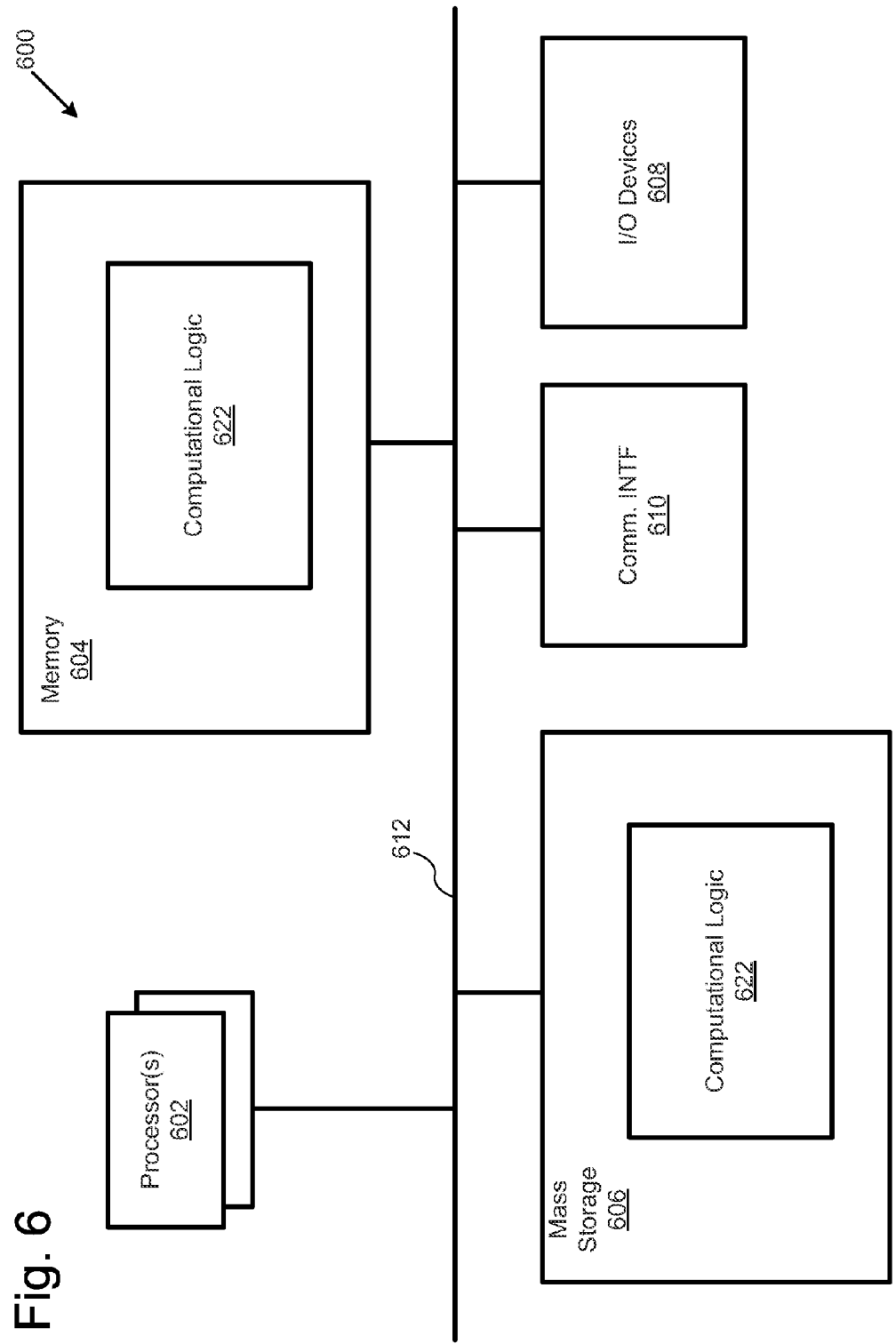
FIG. 6 illustrates an example computing environment suitable for practicing the disclosure, in accordance with various embodiments.

Referring now to FIG. 6, an example computer suitable for use for the arrangement of FIG. 1, in accordance with various embodiments, is illustrated. In embodiments, the computer 600 may be suitable for use as a stationary or mobile computing device. As shown, computer 600 may include one or more processors or processor cores 602, and system memory 604. For the purpose of this application, including the claims, the terms "processor" and "processor cores" may be considered synonymous, unless the context clearly requires otherwise. Additionally, computer 600 may include mass storage devices 606 (such as diskette, hard drive, compact disc read only memory (CD-ROM) and so forth), input/output devices 608 (such as display, keyboard, cursor control and so forth) and communication interfaces 610 (such as network interface cards, modems and so forth). The elements may be coupled to each other via system bus 612, which may represent one or more buses. In the case of multiple buses, they may be bridged by one or more bus bridges (not shown).

Each of these elements may perform its conventional functions known in the art. In particular, system memory 604 and mass storage devices 606 may be employed to store a working copy and a permanent copy of the programming instructions implementing the operations associated with content aggregator/distributor servers 104, e.g., the segmenting and/or encoding operations as earlier described. The various elements may be implemented by assembler instructions supported by processor(s) 602 or high-level languages, such as, for example, C, that can be compiled into such instructions.

The permanent copy of the programming instructions may be placed into permanent storage devices 606 in the factory, or in the field, through, for example, a distribution medium (not shown), such as a compact disc (CD), or through communication interface 610 (from a distribution server (not shown)). That is, one or more distribution media having an implementation of the agent program may be employed to distribute the agent and program various computing devices.

The number, capability and/or capacity of these elements 610-612 may vary, depending on whether computer 600 is used as a content aggregator/distributor server 104 or a content consumption device 108, whether the content consumption device 108 is a stationary or mobile device, like a smartphone, computing tablet, ultrabook or laptop. Their constitutions are otherwise known, and accordingly will not be further described.

Figure 7:
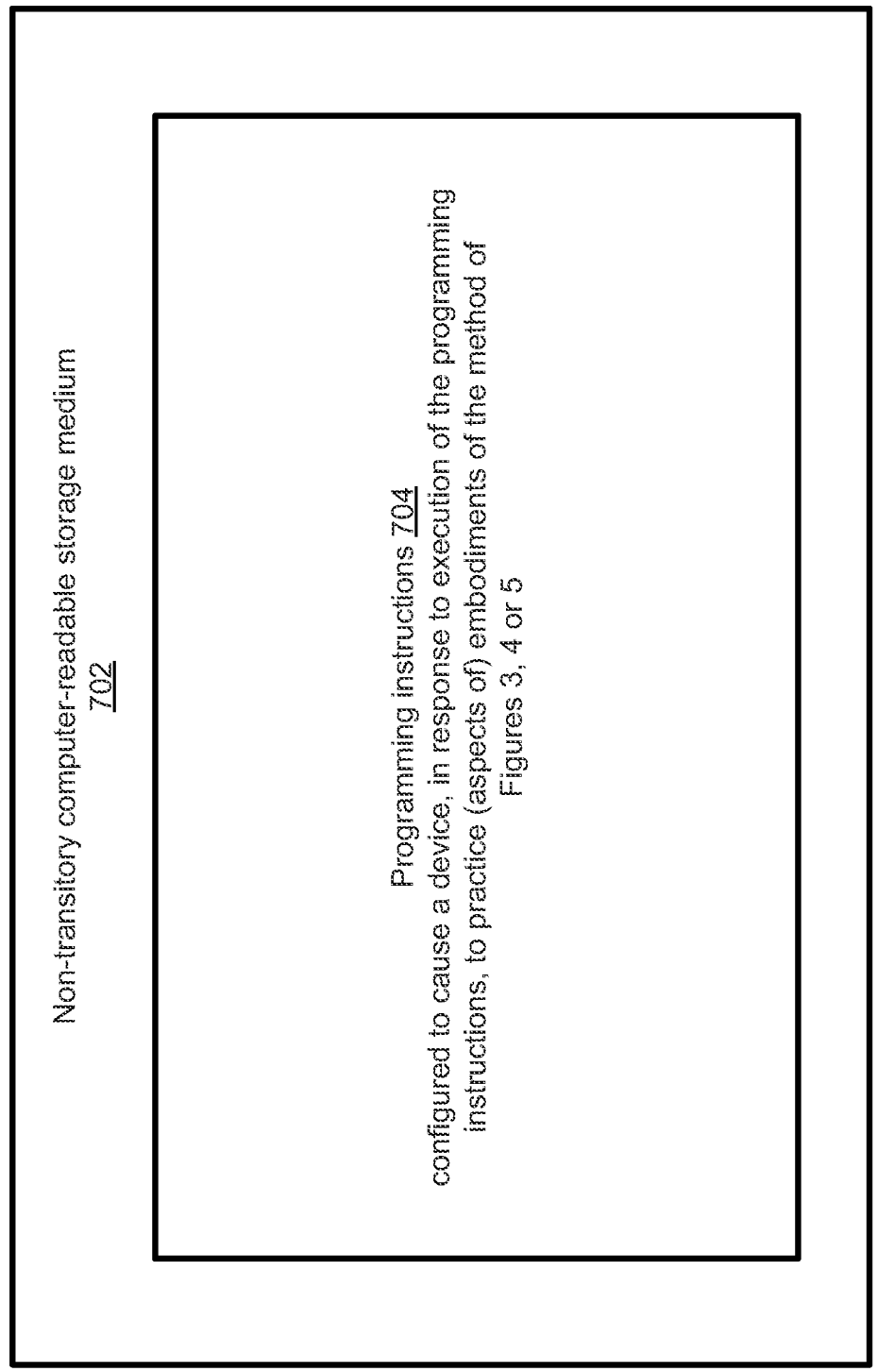
FIG. 7 illustrates an example storage medium with instructions configured to enable an apparatus to practice the present disclosure, in accordance with various embodiments.

FIG. 7 illustrates an example non-transitory computer-readable storage medium having instructions configured to practice all or selected ones of the operations associated with content aggregator/distributor servers 104, content consumption device(s) 108, or a separate luminance analysis server earlier described; in accordance with various embodiments. As illustrated, non-transitory computer-readable storage medium 702 may include a number of programming instructions 704. Programming instructions 704 may be configured to enable a device, e.g., computer 600, in response to execution of the programming instructions, to perform, e.g., various operations of processes 300, 400 or 500. In alternate embodiments, programming instructions 704 may be disposed on multiple non-transitory computer-readable storage media 702 instead.

Referring back to FIG. 6, for one embodiment, at least one of processors 602 may be packaged together with computational logic 622 configured to practice aspects of processes 300, 400 or 500. For one embodiment, at least one of processors 602 may be packaged together with computational logic 622 configured to practice aspects of processes 300, 400 or 500 to form a System in Package (SiP). For one embodiment, at least one of processors 602 may be integrated on the same die with computational logic 622 configured to practice aspects of processes 300, 400 or 500. For one embodiment, at least one of processors 602 may be packaged together with computational logic 622 configured to practice aspects of processes 300, 400 or 500 to form a System on Chip (SoC). For at least one embodiment, the SoC may be utilized in, e.g., but not limited to, a computing tablet.

In some embodiments, one or more of the processors 602 or the computational logic 622 may comprise or be coupled with camera control logic configured to operate a camera, for example camera 138, according to aspects of processes 300, 400, or 500 above. In some embodiments, one or more of the processors 602 or the computational logic may comprise or be coupled with a recognition module configured to provide image recognition, for example facial recognition, according to aspects of processes 300, 400, or 500 above.

The various embodiments of the present disclosure have been described including, but are not limited to:

Example 1 may be an apparatus to facilitate image capture including one or more computer processors; a presentation engine configured be operated on the one or more computer processors to identify a frame among a plurality of frames to be displayed on a display, based on luminance levels of the frames; a camera coupled to the one or more processors; and a camera control module configured to be operated on the one or more processors to control the camera to capture an image at a point in time that is selected based at least in part on a result of the identification.

Example 2 may include the subject matter of example 1, and further specify that the point is time is a point in time concurrent with display of a frame among the plurality of frames which has a highest luminance level out of the plurality of frames.

Example 3 may include the subject matter of example 1, and further specify that the camera is configured to capture an image of an audience of one or more people viewing the one or more images on the display.

Example 4 may include the subject matter of example 3, and further include a recognition module configured to be operated on the one or more processors to analyze the image and identify at least one person from the audience.

Example 5 may include the subject matter of any of examples 1-4, and further include a receiver configured to receive, from a server, the one or more frames of media content.

Example 6 may include the subject matter of any of examples 1-4, and further specify that a luminance level for a frame is an average luminance level for the frame.

Example 7 may include the subject matter of any of examples 1-4, and further specify that the presentation engine is further configured to identify the frame with the highest luminance level based at least in part on an analysis of luminance levels for respective frames of the one or more frames.

Example 8 may include the subject matter of any of examples 1-4, and further specify that the presentation engine is further configured to receive, from a server, luminance data indicating the luminance level of at least one of the one or more frames, the luminance data including a table including the luminance level of each frame in the one or more frames; and the presentation engine is further configured to identify the frame with the highest luminance level based at least in part on the luminance data.

Example 9 may include the subject matter of any of examples 1-4, and further specify that the apparatus includes one or more of: a personal digital assistant (PDA), a smartphone, a computing tablet, an e-reader, an ultrabook, a laptop computer, a desktop computer, a server, a set-top box, or a game console.

Example 10 may be at least one storage medium having a plurality of instructions to facilitate image capture, the instructions configured to cause an apparatus, in response to execution of the instructions by the apparatus, to select a point in time to capture an image, based at least in part on information associated with luminance levels of a plurality of frames to be displayed; and control a camera of the apparatus to capture the image at the point in time.

Example 11 may include the subject matter of example 10, and further specify that the point in time is a point in time concurrent with display of a frame among the plurality of frames with a highest luminance level among the plurality of frames.

Example 12 may include the subject matter of example 10, and further specify that the instructions are further configured to cause the apparatus, in response to execution of the instructions by the apparatus, to identify, based at least in part on the image, at least one member of an audience including one or more people viewing the one or more frames.

Example 13 may include the subject matter of example 10, and further specify that a luminance level for a frame is an average luminance level for the frame.

Example 14 may include the subject matter of any of examples 10-13, and further specify that the instructions are further configured to cause the apparatus, in response to execution of the instructions by the apparatus, to receive, from a server, the one or more frames of media content.

Example 15 may include the subject matter of any of examples 10-13, and further specify that the instructions are further configured to cause the apparatus, in response to execution of the instructions by the apparatus, to identify the frame with the highest luminance level based at least in part on analyzing the luminance levels for respective frames of the one or more frames.

Example 16 may include the subject matter of any of examples 10-13, and further specify that the instructions are further configured to cause the apparatus, in response to execution of the instructions by the apparatus, to receive a luminance data indicating the luminance level of at least one of the one or more frames; and identify the frame with the highest luminance level in the one or more frames based at least in part on the luminance data.

Example 17 may include the subject matter of example 16, and further specify that the luminance data includes a table including the luminance level of each frame in the one or more frames.

Example 18 may be a method for facilitating image capture including identifying, by a computing device, a frame among a plurality of frames to be displayed on a display, based on luminance levels of the frames and controlling, by the computing device, capture of an image at a point in time that is selected based at least in part on a result of the identification.

Example 19 may include the subject matter of example 18, and further specify that the image is an image of an audience of one or more people viewing the one or more images on the display. Example 19 may further include analyzing, by the computing device, the image; and identifying, by the computing device, at least one person from the audience based at least in part on the analyzing the image.

Example 20 may include the subject matter of examples 18 or 19, and further include identifying, by the computing device, the frame with the highest luminance level based at least in part on analyzing luminance levels for respective frames of the one or more frames.

Example 21 may include the subject matter of examples 18 or 19, and further include receiving, by the computing device, from a server, luminance data indicating the luminance level of at least one of the one or more frames; and identifying, by the computing device, the frame with the highest luminance level based at least in part on the luminance data.

Example 22 may be a device to facilitate image capture including means to identify a frame among a plurality of frames to be displayed on a display, based on luminance levels of the frames; and means to control capture of an image at a point in time that is selected based at least in part on a result of the identification.

Example 23 may include the subject matter of example 22, and further specify that the image is an image of an audience of one or more people viewing the one or more images on the display, and further including means to analyze the image and means to identify at least one person from the audience based at least in part on the analyzing the image.

Example 24 may include the subject matter of examples 22 or 23, and further include means to identify the frame with the highest luminance level based at least in part on analyzing luminance levels for respective frames of the one or more frames.

Example 25 may include the subject matter of examples 22 or 23, and further include means to receive from a server, luminance data indicating the luminance level of at least one of the one or more frames; and means to identify the frame with the highest luminance level based at least in part on the luminance data.

Example 26 may be a device to facilitating image capture including means to determine a luminance level of at least one frame in a plurality of frames of the video content; means to generate a luminance level data structure configured to be interpreted by a display device to facilitate detection of a frame with a highest luminance level out of the plurality of frames, the luminance level data structure based at least in part on the luminance level of the at least one frame; and means to transmit the plurality of frames and the luminance level data structure to the display device.

Example 27 may include the subject matter of example 26, and further specify that the data structure includes a luminance level and a presentation time of one or more frames out of the plurality of frames.

Example 28 may include the subject matter of example 27, and further specify that the luminance level for a frame is an average luminance level for the frame.

Example 29 may include the subject matter of any of examples 26-28, and further include means to facilitate identification by the display device at least one person in an audience of one or more people viewing the frames based at least in part on the luminance level data structure.

Example 30 may be at least one storage medium having a plurality of instructions to facilitate image capture, the instructions configured to cause an apparatus, in response to execution of the instructions by the apparatus, to determine a luminance level of at least one frame in a plurality of frames of the video content; generate a luminance level data structure configured to be interpreted by a display device to facilitate detection of a frame with a highest luminance level out of the plurality of frames, the luminance level data structure based at least in part on the luminance level of the at least one frame; and transmit the plurality of frames and the luminance level data structure to the display device.

Example 31 may include the subject matter of example 30, and further specify that the data structure includes a luminance level and a presentation time of one or more frames out of the plurality of frames.

Example 32 may include the subject matter of example 31, and further specify that the luminance level for a frame is an average luminance level for the frame.

Example 33 may include the subject matter of any of examples 30-32, and further specify that the instructions are further configured cause the apparatus, in response to execution of the instructions by the apparatus, to facilitate identification by the display device at least one person in an audience of one or more people viewing the frames based at least in part on the luminance level data structure.

Example 34 may be a method for facilitating image capture including determining a luminance level of at least one frame in a plurality of frames of the video content; generating a luminance level data structure configured to be interpreted by a display device to facilitate detection of a frame with a highest luminance level out of the plurality of frames, the luminance level data structure based at least in part on the luminance level of the at least one frame; and transmitting the plurality of frames and the luminance level data structure to the display device.

Example 35 may include the subject matter of example 34, and further specify that the data structure includes a luminance level and a presentation time of one or more frames out of the plurality of frames.

Example 36 may include the subject matter of example 35, and further specify that the luminance level for a frame is an average luminance level for the frame.

Example 37 may include the subject matter of any of examples 34-36, and further include facilitating identification by the display device at least one person in an audience of one or more people viewing the frames based at least in part on the luminance level data structure.

Example 38 may be a device to facilitate image capture including a processor configured to determine a luminance level of at least one frame in a plurality of frames of the video content; and generate a luminance level data structure configured to be interpreted by a display device to facilitate detection of a frame with a highest luminance level out of the plurality of frames, the luminance level data structure based at least in part on the luminance level of the at least one frame. The device may further include a transmitter coupled with the processor and configured to transmit the plurality of frames and the luminance level data structure to the display device.

Example 39 may include the subject matter of example 38, and further specify that the data structure includes a luminance level and a presentation time of one or more frames out of the plurality of frames.

Example 40 may include the subject matter of example 39, and further specify that the luminance level for a frame is an average luminance level for the frame.

Example 41 may include the subject matter of any of examples 38-40, and further specify that the processor is further configured to facilitate identification by the display device at least one person in an audience of one or more people viewing the frames based at least in part on the luminance level data structure.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. At least one non-transitory computer-readable storage medium having a plurality of instructions to cause an apparatus, in response to execution of the instructions by the apparatus, to:
   select, prior to display of a plurality of frames of media content that are to be displayed, a point in time to capture an image based at least in part on information associated with luminance levels of the plurality of frames of media content; and
   control a camera of the apparatus to capture the image at the point in time.

2. The at least one non-transitory computer-readable storage medium of claim 1, wherein the point in time is a point in time concurrent with display of a frame among the plurality of frames with a highest luminance level among the plurality of frames.

3. The at least one non-transitory computer-readable storage medium of claim 1, wherein the instructions are further to cause the apparatus, in response to execution of the instructions by the apparatus, to identify, based at least in part on the image, at least one member of an audience comprising one or more people viewing the one or more frames.

4. The at least one non-transitory computer-readable storage medium of claim 1, wherein a luminance level for a frame is an average luminance level for the frame.

5. The at least one non-transitory computer-readable storage medium of claim 1, wherein the instructions are further to cause the apparatus, in response to execution of the instructions by the apparatus, to receive, from a server, the one or more frames of media content.

6. The at least one computer-readable storage medium of claim 1, wherein the instructions are further configured to cause the apparatus, in response to execution of the instructions by the apparatus, to identify the frame with the highest luminance level based at least in part on analyzing the luminance levels for respective frames of the one or more frames.

7. The at least one non-transitory computer-readable storage medium of claim 1, wherein the instructions are further to cause the apparatus, in response to execution of the instructions by the apparatus, to receive a luminance data indicating the luminance level of at least one of the one or more frames; and
   identify the frame with the highest luminance level in the one or more frames based at least in part on the luminance data.

8. The at least one non-transitory computer-readable storage medium of claim 7, wherein the luminance data comprises a table comprising the luminance level of each frame in the one or more frames.

9. At least one non-transitory computer-readable storage medium having a plurality of instructions to cause an apparatus, in response to execution of the instructions by the apparatus, to:
   determine a luminance level of at least one frame in a plurality of frames of video content prior to display of the at least one frame;
   generate a luminance level data structure to be interpreted by a display device, wherein the luminance level date structure is to facilitate detection of a frame with a highest luminance level out of the plurality of frames, and wherein the luminance level data structure is based at least in part on the luminance level of the at least one frame, and wherein the luminance level data structure is a table that includes an indication of a presentation time of respective frames in the plurality of frames and an indication of a luminance level of each frame in the one or more frames;
   transmit the plurality of frames and the luminance level data structure to the display device; and
   control a camera of the apparatus to capture an image at point in time that is identified based on the luminance level data structure.

10. The at least one non-transitory computer-readable storage medium of claim 9, wherein the luminance level for a frame is an average luminance level for the frame.

11. The at least one non-transitory computer-readable storage medium of claim 9, wherein the instructions are further to cause the apparatus, in response to execution of the instructions by the apparatus, to facilitate identification by the display device at least one person in an audience of one or more people viewing the frames based at least in part on the luminance level data structure.

12. An apparatus comprising:
one or more computer processors;
a presentation engine be operated on the one or more computer processors to identify, prior to display of a frame among a plurality of frames to be displayed on a display, the frame based on luminance levels of the frames;
a camera coupled to the one or more processors; and
a camera control module to be operated on the one or more processors to control the camera to capture an image at a point in time that is selected based at least in part on a result of the identification.

13. The apparatus of claim 12, wherein the point in time is a point in time concurrent with display of a frame among the plurality of frames which has the highest luminance level out of the plurality of frames.

14. The apparatus of claim 12, wherein the camera is to capture an image of an audience of one or more people viewing the one or more images on the display.

15. The apparatus of claim 14, further comprising a recognition module to be operated on the one or more processors to:
analyze the image; and
identify at least one person from the audience.

16. The apparatus of claim 12, further comprising a receiver to receive, from a server, the plurality of frames.

17. The apparatus of claim 12, wherein a luminance level for a frame is an average luminance level for the frame.

18. The apparatus of claim 12, wherein the presentation engine is further to identify the frame with the highest luminance level based at least in part on an analysis of luminance levels for respective frames of the one or more frames.

19. The apparatus of claim 12, wherein the presentation engine is further to receive, from a server, luminance data indicating the luminance level of at least one of the one or more frames, the luminance data comprising a table comprising the luminance level of each frame in the one or more frames; and
the presentation engine is further to identify the frame with the highest luminance level based at least in part on the luminance data.

20. The apparatus of claim 12, wherein the apparatus comprises one or more of: a personal digital assistant (PDA), a smartphone, a computing tablet, an e-reader, an ultrabook, a laptop computer, a desktop computer, a server, a set-top box, or a game console.

21. A method comprising:
identifying, by a computing device prior to display of a frame among a plurality of frames to be displayed on a display, the frame based on luminance levels of the frames; and
controlling, by the computing device, capture of an image at a point in time that is selected based at least in part on a result of the identification.

22. The method of claim 21, wherein the image is an image of an audience of one or more people viewing the one or more images on the display, and wherein the method further comprises;
analyzing, by the computing device, the image; and
identifying, by the computing device, at least one person from the audience based at least in part on the analyzing the image.

23. The method of claim 21, further comprising identifying, by the computing device, the frame with the highest luminance level based at least in part on analyzing luminance levels for respective frames of the one or more frames.

24. The method of claim 21, further comprising:
receiving, by the computing device, from a server, luminance data indicating the luminance level of at least one of the one or more frames; and
identifying, by the computing device, the frame with the highest luminance level based at least in part on the luminance data.

* * * * *